(12) United States Patent
Jho et al.

(10) Patent No.: US 11,403,284 B2
(45) Date of Patent: Aug. 2, 2022

(54) SYSTEM FOR DATA SHARING PLATFORM BASED ON DISTRIBUTED DATA SHARING ENVIRONMENT BASED ON BLOCK CHAIN, METHOD OF SEARCHING FOR DATA IN THE SYSTEM, AND METHOD OF PROVIDING SEARCH INDEX IN THE SYSTEM

(71) Applicant: ELECTRONICS AND TELECOMMUNICATIONS RESEARCH INSTITUTE, Daejeon (KR)

(72) Inventors: Nam Su Jho, Daejeon (KR); Ju Young Kim, Daejeon (KR); Taek Young Youn, Daejeon (KR); Ku Young Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 103 days.

(21) Appl. No.: 16/811,051

(22) Filed: Mar. 6, 2020

(65) Prior Publication Data

US 2020/0285634 A1 Sep. 10, 2020

(30) Foreign Application Priority Data

Mar. 8, 2019 (KR) ........................ 10-2019-0027144

(51) Int. Cl.
*G06F 16/23* (2019.01)
*G06F 16/22* (2019.01)
(Continued)

(52) U.S. Cl.
CPC ...... *G06F 16/2379* (2019.01); *G06F 16/2246* (2019.01); *G06F 16/2255* (2019.01)

(58) Field of Classification Search
CPC ............. G06F 16/2379; G06F 16/2246; G06F 16/2255; G06F 21/64; G06F 21/6218;
(Continued)

(56) References Cited

U.S. PATENT DOCUMENTS 8,510,513 B2 8/2013 Lee et al.
11,128,528 B2 * 9/2021 Nolan ................. H04L 67/1046
(Continued)

FOREIGN PATENT DOCUMENTS

KR 20170122048 A * 11/2017
KR 10-2018-0117119 A 10/2018

OTHER PUBLICATIONS

Eu-Jin Goh, "Secure indexes", IACR Cryptology ePrint Archive, 2003.

*Primary Examiner* — Robert W Beausoliel, Jr.
*Assistant Examiner* — Mohammad S Bhuyan
(74) *Attorney, Agent, or Firm* — LRK Patent Law Firm

(57) ABSTRACT

A method of providing a search index based on a Bloom filter in a distributed data sharing environment based a block chain includes generating, by a data generating device, Bloom filters used as the search index on the basis of a hash value calculated by applying a hash function to a keyword set for searching for data which is to be shared, generating, by a block providing server, a new block on the basis of the Bloom filters and the data received from the data generating device and performing proof of work (PoW) on the new block, for adding the new block to the block chain, and distributing, by a block distributing server, block chain data including the new block added to the block chain.

10 Claims, 6 Drawing Sheets

(51) Int. Cl.
*G06F 21/62* (2013.01)
*G06F 21/64* (2013.01)
*G06F 16/2458* (2019.01)

(58) Field of Classification Search
CPC ............. G06F 16/2471; H04L 2209/38; H04L 9/0643; H04L 9/0637
See application file for complete search history.

(56) References Cited

U.S. PATENT DOCUMENTS

| | | | |
|---|---|---|---|
| 2014/0143549 A1* | 5/2014 | Araki | G06F 16/322 |
| | | | 713/175 |
| 2018/0089041 A1* | 3/2018 | Smith | G06F 16/2255 |
| 2018/0137196 A1 | 5/2018 | Han et al. | |
| 2018/0198794 A1 | 7/2018 | Huh et al. | |
| 2019/0057211 A1 | 2/2019 | Wright et al. | |
| 2019/0058592 A1 | 2/2019 | Wright et al. | |
| 2020/0242081 A1* | 7/2020 | Lee | G06F 16/176 |
| 2020/0278963 A1* | 9/2020 | Destefanis | H04L 67/1093 |
| 2021/0073410 A1* | 3/2021 | Yan | G06F 21/53 |

* cited by examiner

SYSTEM FOR DATA SHARING PLATFORM BASED ON DISTRIBUTED DATA SHARING ENVIRONMENT BASED ON BLOCK CHAIN, METHOD OF SEARCHING FOR DATA IN THE SYSTEM, AND METHOD OF PROVIDING SEARCH INDEX IN THE SYSTEM

CROSS-REFERENCE TO RELATED APPLICATION(S)

This application claims priority under 35 U.S.C. § 119 to Korean Patent Application No. 10-2019-0027144, filed Mar. 8, 2019, the disclosure of which is incorporated herein by reference in its entirety.

BACKGROUND

1. Technical Field

The present invention relates to a system and method of efficiently searching for data desired by an individual user in a distributed data sharing environment based on a block chain having no central reliability organization.

2. Description of Related Art

Recently, interest in data sharing platform in a distributed data sharing environment based on a block chain is increasing. The data sharing platform based on the block chain may prevent a specific company from monopolizing data and may ensure a right to personal data possessed by a user.

However, there is a problem where each user is difficult to search for specific data desired by each user in a process of using data of the data sharing platform based on the block chain. In a database system of the related art, since a database manager constructs and provides a search index corresponding to a database table, a user may efficiently search for data desired by the user on the basis of the search index provided by the database manager, but in the distributed data sharing environment based on the block chain, since there is no separate node for constructing and providing a search index, the search index is not provided.

In a case where an individual participant (or a specific node) constructs and provides a search index autonomously, it is impossible to control a malicious behavior where the individual participant (or the specific node) provides only a search index corresponding to data favorable thereto and excludes a search index corresponding to data unfavorable thereto in constructing a search index, and due to this, it is unable to ensure the reliability of a search index constructed by the individual participant (or the specific node).

SUMMARY

Accordingly, the present invention provides a system for data sharing platform in a distributed data sharing environment based on a block chain and a method of providing a search index based on a Bloom filter in the system, which provide a search index for efficient data search and simultaneously ensure the integrity of the search index.

In one general aspect, a method of providing a search index based on a Bloom filter in a distributed data sharing environment based a block chain includes: generating, by a data generating device, Bloom filters used as the search index on the basis of a hash value calculated by applying a hash function to a keyword set for searching for data which is to be shared; generating, by a block providing server, a new block on the basis of the Bloom filters and the data received from the data generating device and performing proof of work (PoW) on the new block, for adding the new block to the block chain; and distributing, by a block distributing server, block chain data including the new block added to the block chain.

In another general aspect, a search method based on a Bloom filter form in a distributed data sharing environment based a block chain includes: generating, by a data generating device, Bloom filters used as a search index by applying a hash function to a keyword set for searching for data which is to be shared; constructing, by a block providing server, a block header on the basis of the Bloom filters generated by the data generating device and performing proof of work (PoW) on the basis of the block header to generate a new block including the block header; and receiving, by a block distributing server, block chain data including the new block from the block providing server and distributing the block chain data; and searching for, by a user device, data including a specific keyword in the block chain data.

In another general aspect, a system for providing a search index having a Bloom filter form in a distributed data sharing environment based a block chain includes: a data generating device configured to generate Bloom filters used as a search index on the basis of a hash value calculated by applying a hash function to a keyword set for searching for data which is to be shared; a block providing server configured to generate a new block on the basis of the Bloom filters and the data received from the data generating device and to perform proof of work (PoW) on the new block, for adding the new block to the block chain; and a block distributing server configured to distribute block chain data including the new block added to the block chain.

Other features and aspects will be apparent from the following detailed description, the drawings, and the claims.

DETAILED DESCRIPTION OF EMBODIMENTS

Figure 1:
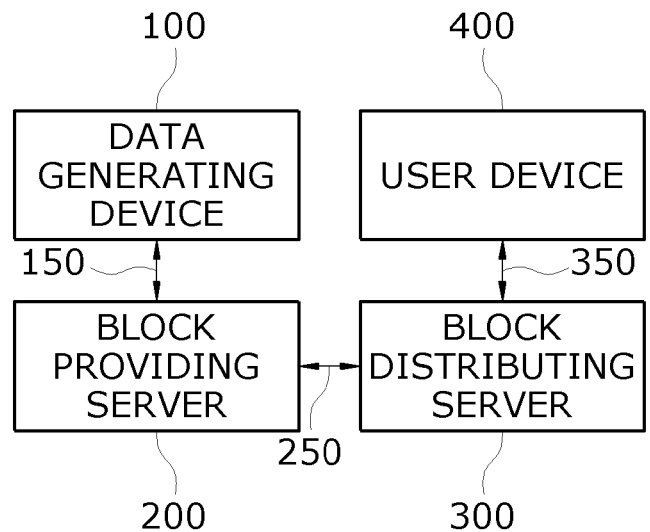
FIG. 1 is a block diagram illustrating a system for data sharing platform in a distributed data sharing environment based on a block chain, according to an embodiment of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a block diagram illustrating a system for data sharing platform in a distributed data sharing environment based on a block chain, according to an embodiment of the present invention.

Referring to FIG. 1, the system for data sharing platform in the distributed data sharing environment based on the block chain may include a data generating device 100, a block providing server 200, a block distributing server 300, and a user device 400.

The data generating device 100 may generate an identifier (ID) of the data generating device 100 or a data provider, data D to be shared through the data sharing platform according to an embodiment of the present invention, and a data transaction (or a block chain transaction) including a search index having a Bloom filter form.

The block providing server 200 may continuously collect the data transaction from the data generating device 100, generate a new block on the basis of Bloom filters corresponding to the search index included in the collected data transaction, and perform proof of work (PoW) for adding the new block to the block chain. The block chain may be a set of blocks.

That is, a block may be an element of the block chain, and for example, may denote a bundle of pieces of transaction information. In this case, the block chain may denote a bundle of massive transaction information. The block may include a block header, the data D, and other information.

The block header may include a hash value of a block (hereinafter referred to as a previous block) generated before the block providing server 200 generates a new block, Merkle tree information generated from a data transaction which is to be included in the new block, and a nonce value calculated based on the PoW, and additionally, may further include Bloom filter tree information generated from Bloom filters corresponding to the search index.

The block distributing server 300 may distribute (propagate) data, which is a block chain including a new block added to the block chain by the block providing server 200, to all nodes.

The user device 400 may search for data including a specific keyword in the block chain data.

Figure 2:
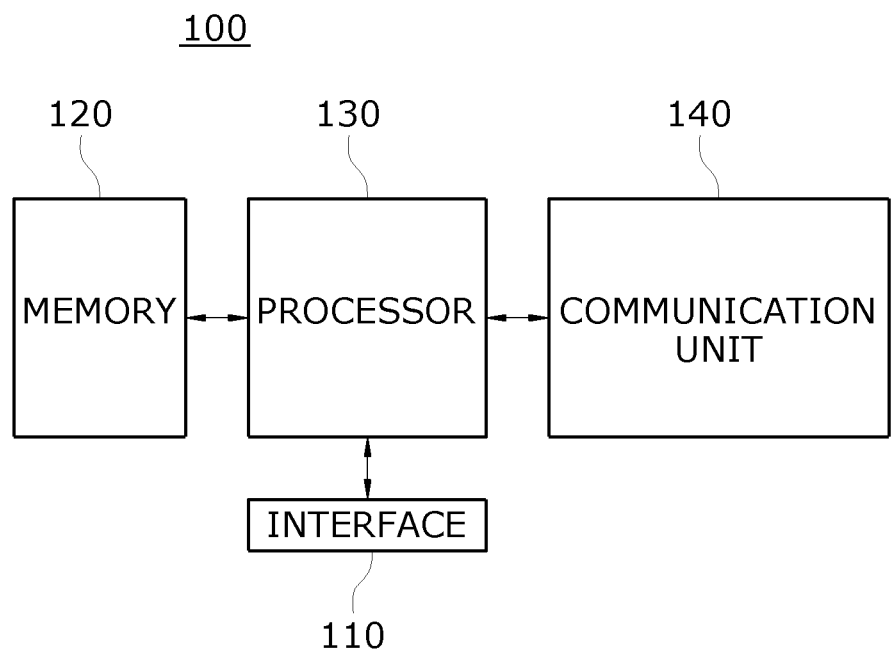
FIG. 2 is a block diagram schematically illustrating an internal configuration of a data generating device illustrated in FIG. 1.

FIG. 2 is a block diagram schematically illustrating an internal configuration of the data generating device 100 illustrated in FIG. 1.

Referring to FIG. 2, the data generating device 100 may be a computing device operated by a data provider and may include an interface 110, a memory 120, a processor 130, and a communication unit 140.

The interface 110 may be an input device which transfers an input or a command of the data provider to the processor 130.

The memory 120, a storage medium, may store an algorithm which implements a Bloom filter generating function and a hash function for generating a Bloom filter. The memory 120 may include a non-volatile memory and a volatile memory. Here, the hash function and the Bloom filter generating function may each be a function which is defined in the data sharing platform according to an embodiment of the present invention.

The processor 130 may be an element for controlling the interface 110, the memory 120, and the communication unit 140 and may be referred to as a central processing unit (CPU) or a microprocessor. The processor 130 may analyze a user command transferred through the interface 110 and may execute the algorithm stored in the memory 120 on the basis of a result of the analysis.

The processor 130 may execute the algorithm to generate an ID of the data provider, data D to be shared through the data sharing platform according to an embodiment of the present invention, and a data transaction (or a block chain transaction) including a search index having a Bloom filter form.

The communication unit 140 may construct a communication channel 150 between the data generating device 100 and the data providing server 200, and the communication channel may include a wired communication channel and/or a wireless communication channel. The communication unit 140 may transmit a data transaction (or a block chain transaction), generated by the processor 130, to the block providing server 200 through the wired/wireless communication channel.

The processor 130 may select data D which is to be shared by the data provider and may determine a keyword set $\{K_1, K_2, \ldots, K_n\}$ for searching for the selected data D, based on an input of a command of the data provider transferred through the interface 110. The selected data D and the determined keyword set $\{K_1, K_2, \ldots, K_n\}$ may be temporarily stored in the memory 120 on the basis of control by the processor 130.

The processor 130 may call the hash function stored in the memory 120, apply the called hash function to the determined keyword set $\{K_1, K_2, \ldots, K_n\}$ to calculate a hash value, and generate Bloom filters corresponding to a search index on the basis of the calculated hash value.

The hash function may be defined as d (where d is an integer of 2 or more) number of hash functions $h_1$, $h_2, \ldots,$ and $h_d$. Each of the d hash functions may output, a hash value h(K), an integer value of 1 to m (where m is an integer of 2 or more) on the basis of an input (a keyword K) having an arbitrary length (a bit length). Each of the Bloom filters may be defined as a bit string having an m-bit size.

A process of generating a Bloom filter having an m-bit size on the basis of the keyword set $\{K_1, K_2, \ldots, K_n\}$ will be described below.

First, when the Bloom filter generating function stored in the memory 120 is 'BF( )', the processor 130 may call the Bloom filter generating function BF( ) stored in the memory 120 and may apply the called Bloom filter generating function BF( ) to the keyword set $\{K_1, K_2, \ldots, K_n\}$ determined by the data provider to first generate a Bloom filter F. In this case, the first-generated Bloom filter F may be expressed as the following Equation.

$$F=BF(\{K_1,K_2,\ldots,K_n\}) \quad \text{[Equation]}$$

Subsequently, the processor 130 may initialize bit values (binary values) of all bits, constituting the first-generated Bloom filter $F=BF(\{K_1, K_2, \ldots, K_n\})$, to '0'.

Subsequently, the processor 130 may call the d hash functions $h_1, h_2, \ldots,$ and $h_d$ stored in the memory 120, apply the called d hash functions $h_1, h_2, \ldots,$ and $h_d$ to one keyword $K_1$ to calculate d number of hash values (or key values) $h_1(K_1), h_2(K_1), \ldots,$ and $h_d(K_1)$, and correct a $h_1(K_1)^{th}$ bit value of F from 0 to 1.

That is, the processor 130 may set bit values '0' of all bits, which are at positions of d number of bits defined by the d hash values $h_1(K_1), h_2(K_1), \ldots,$ and $h_d(K_1)$ among all bits constituting the Bloom filter F=BF( ), to '1'. By sequentially performing such a process on the other keywords $K_2, \ldots,$ and $K_n$, Bloom filters $F_D=BF(\{K_1, K_2, \ldots, K_n\})$ may be generated.

When the processor 130 generates (or calculates) the Bloom filters $F_D$ by using the d hash functions $h_1, h_2, \ldots,$ and $h_d$ and the Bloom filter generating function BF( ), the processor 130 may generate a data transaction (or a block chain transaction)<ID, D, $F_D$> including the ID of the data provider, data D corresponding to a sharing target, and the Bloom filters $F_D$.

The generated data transaction <ID, D, $F_D$> may be transmitted to the block providing server 200 through the communication unit 140 on the basis of control by the processor 130.

Figure 3:
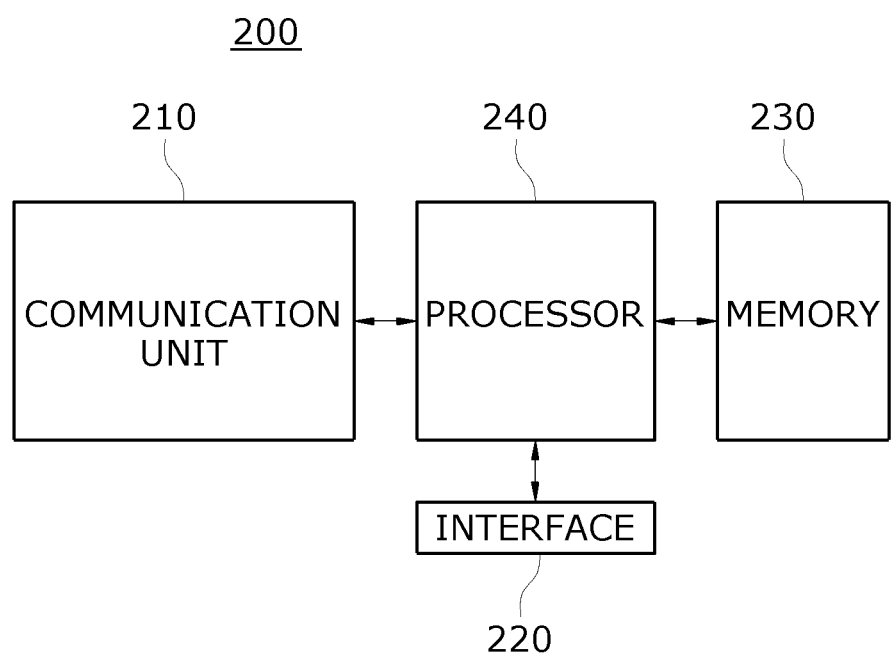
FIG. 3 is a block diagram schematically illustrating an internal configuration of a block providing server illustrated in FIG. 1.
Figure 4:
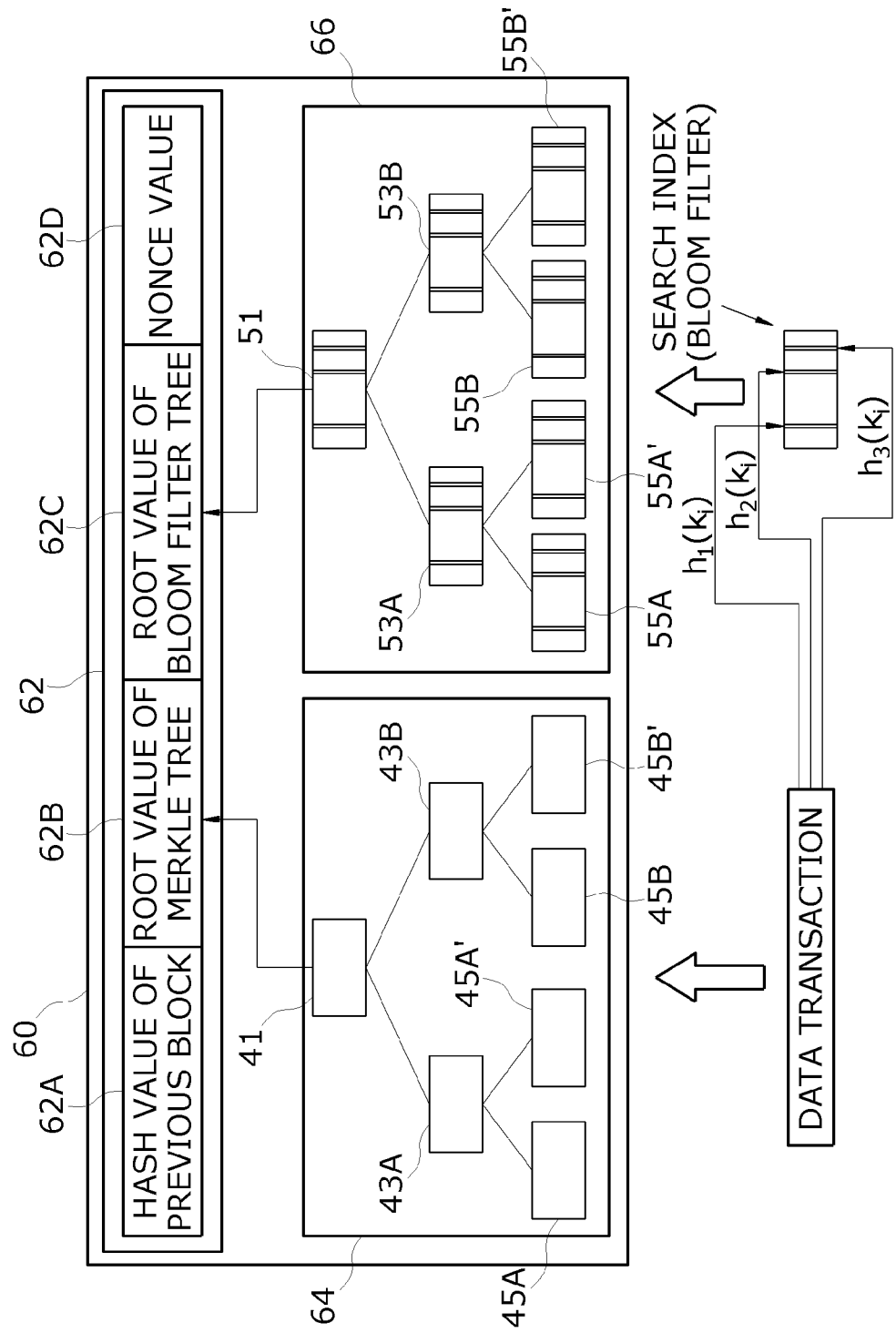
FIG. 4 is a diagram illustrating a block header structure according to an embodiment of the present invention.

FIG. 3 is a block diagram schematically illustrating an internal configuration of the block providing server 200 illustrated in FIG. 1, and FIG. 4 is a diagram illustrating a block header structure according to an embodiment of the present invention.

Referring to FIG. 3, the block providing server 200 may continuously collect the data transaction from the data generating device 100, generate a new block on the basis of the data D corresponding to a sharing target and the Bloom filters $F_D$ corresponding to the search index included in the collected data transaction.

The block providing server 200 may execute a consensus algorithm based on PoW to perform PoW for adding the new block to the block chain.

The block providing server 200 may be a computing device having a communication function and may include a communication unit 210, an interface 220, a memory 230, and a processor 240.

The communication unit 210 may construct the communication channel 150 along with the communication unit 140 included in the data generating device 100, and moreover, may construct a communication channel 250 along with a communication unit 310 included in the block distributing server.

The communication unit 210 may construct a communication channel, and the communication channel may include a wired and/or wireless communication channel. The communication unit 210 may continuously receive a data transaction from the data generating device 100 through the communication channel (150 of FIG. 1).

The interface 220 may be an input device which transfers an input or a command of an operator of the block providing server 200 to the processor 230.

The memory 230, a storage medium, may include a non-volatile memory and a volatile memory. The memory 230 may store a data transaction received through the communication unit 210. Also, the memory 230 may store various algorithms for a block and a block chain.

The algorithms may include, for example, an algorithm for generating a Merkle tree structure from the received data transaction, an algorithm for generating a Bloom filter tree structure from a Bloom filter included in the received data transaction, an algorithm for implementing a cryptologic hash function used to calculate a nonce value included in a block header of a block generated by the processor 240, and a consensus algorithm based on PoW.

The processor 240 may be an element for controlling operations of the communication unit 210, the interface 220, and the memory 120 and may be referred to as a CPU or a microprocessor.

The processor 240 may analyze an operator command transferred through the interface 220 and may execute an algorithm stored in the memory 230 on the basis of a result of the analysis to generate a new block and a block chain.

When one block (a previous block) is completed and disclosed, the processor 240 may perform a generating process on the new block (a current block). In this case, the processor 240 may generate the new block by using a transaction, which is not included in the previous block, among transactions collected through the communication unit 210.

The processor 240 may perform a process constituting a block header among pieces of information included in the new block, for generating the new block.

A block header structure according to an embodiment of the present invention is illustrated in FIG. 4.

Referring to FIG. 4, a block header 62 of a new block 60 may include at least four fields (for example, first to fourth fields) 62A to 62D.

A hash value of a previous block may be recorded in the first field 62A.

A root value (a bit string representing a root node in a Merckle tree structure) of a Merkle tree structure 64 constructed from a data transaction may be recorded in the second field 62B.

A root value (a bit string representing a root node in a Bloom filter tree structure) of a Bloom filter tree structure 66 constructed from Bloom filters may be recorded in the third field 62C.

Moreover, a nonce value calculated based on PoW for adding the new block 60 to a block chain may be recorded in the fourth field 62D.

In order to construct the block header 62, the processor 240 may call an algorithm (hereinafter referred to as a Merkle tree generating algorithm) associated with generating of the Merkle tree structure stored in the memory 230.

The processor 240 may execute the called Merkle tree generating algorithm to perform a process of allocating a transaction, which is not included in the previous block, among transactions collected from the data generating device 100 to a root node 41, leaf nodes 45A, 45A', 45B, and 45B', and middle nodes 43A and 43B between the root node 41 and the leaf nodes 45A, 45A', 45B, and 453 to construct the Merkle tree structure 64.

In this case, each of nodes constituting the Merkle tree structure 64 may connect two child nodes having a corresponding node as a parent node, may apply a hash function to a value corresponding to each of the two connected child nodes to calculate a hash value, and may be expressed as the calculated hash value. Here, a hash value expressing the root node 41 may be used as a representative value of a data transaction.

When the Merkcle tree structure 64 is constructed (or generated), the processor 240 may construct a Bloom filter tree structure 66 of a binary tree structure.

To this end, the processor 240 may call an algorithm (hereinafter referred to as a Bloom filter tree generating algorithm) associated with generating of the Bloom filter tree structure stored in the memory 230.

The processor 240 may execute the called Bloom filter tree generating algorithm to perform a process of allocating the Bloom filters $F_D$, included in a transaction which is not included in the previous block, to a root node 51, leaf nodes 55A, 55A', 55B, and 553, and middle nodes 53A and 53B between the root node 51 and the leaf nodes 55A, 55A', 55B, and 553 to construct the Bloom filter tree structure 66.

In this case, each of nodes constituting the Bloom filter tree structure 66 may express values of two child nodes, having a corresponding node as a parent node, as values calculated based on a bitwise-OR operation. Here, a hash value expressing the root node 51 may be used as a representative value of Bloom filters.

When the Bloom filter tree structure is constructed (or generated), the processor 240 may perform a process of constructing a block header of the new block on the basis of a hash value of the previous block, a root value MRT representing the root node 41 in the Merkle tree structure 64, a root value BFR representing the root node 51 in the Bloom filter tree structure 66, and a nonce value calculated based on the PoW.

The nonce value for constructing the block header may be calculated based on executing of a consensus algorithm based on the PoW.

It may be understood that the PoW proves that 'work' of adding the new block 60 to a block chain is completed. The integrity (reliability) of the new block 60 may be ensured through a PoW-based consensus process.

In order to add the new block 60 to the block chain, it may be needed to calculate a block hash value of the new block 60, and in order to calculate the block hash value, it may be needed to calculate a nonce value among pieces of information included in the block header 62 of the new block 60. The calculation of the nonce value may denote PoW.

The nonce value may be a random number sequence having a predetermined length, and the calculation of the nonce value may be a process of detecting a value satisfying the following condition in block generation difficulty (Block_generation_difficulty) defined by the data sharing platform according to an embodiment of the present invention.

$$H(BH|MRT|BFR|\text{nonce variable}) < \text{Block\_generation\_difficulty} \quad \text{[Condition]}$$

Here, a hash function H( ) may be a cryptologic hash function (hereinafter referred to as a block hash function) used to calculate a nonce value.

In order to calculate the nonce value, the processor 240 may apply the hash function H( ) to a hash value BH of the previous block, the root value MRT representing the root node 41 in the Merkle tree structure 64, the root value BFR representing the root node 51 in the Bloom filter tree structure 66, and a nonce variable.

That is, the processor 240 may apply the block hash function H( ) to the block header 62 by using the BH, MRT, BFR, and nonce variable of the block header 62 as an input of the block hash function H( ).

The processor 240 may input a randomly-set temporary value to the nonce variable until the block hash value calculated by applying the block hash function H( ) to the block header 62 satisfies the condition and may continuously perform an input of a new temporary value until satisfying the condition.

The processor 240 may detect a temporary value satisfying the condition, determine the detected temporary value as the nonce value, generate information included in the block header of the new block 60 on the basis of the determined nonce value, and complete PoW performed on the new block 60. When PoW based on calculation of the nonce value is completed, the integrity (reliability) of the new block 60 may be ensured.

Here, it may be noted that a Bloom filter (i.e., the root value BFR in the Bloom filter tree structure 66) used as a search index is used as an input of the block hash function (the cryptologic hash function) used for calculating the nonce value.

This may denote that a consensus process based on PoW performed on the new block 60 includes a consensus process based on PoW performed on a search index constructed in a Bloom filter form, and thus, ensures the integrity (reliability) of the search index constructed in the Bloom filter form.

The processor 240 may repeat calculation of a nonce value until satisfying the condition. Therefore, the number of calculations needed for the processor 240 generating a new block may increase in proportion to the block generation difficulty defined in the condition.

A calculation processing performance of a processor included in another block providing server may be higher than that of the processor 240 included in the block providing server 200, and when the processor included in the other block providing server calculates the nonce value satisfying the condition prior to the processor 240 to calculate and distribute a new block, the new block generated by the other block providing server may be consented as a block with ensured integrity (reliability).

For example, when the processor 240 included in the block providing server 200 and the processor included in the other block providing server generate new blocks at the same time, it may be recognized that a block providing server, which generates a block constituting a longer chain on the basis of free competition between the block providing server 200 and the other block providing server, generates a new block with ensured integrity (reliability).

Figure 5:
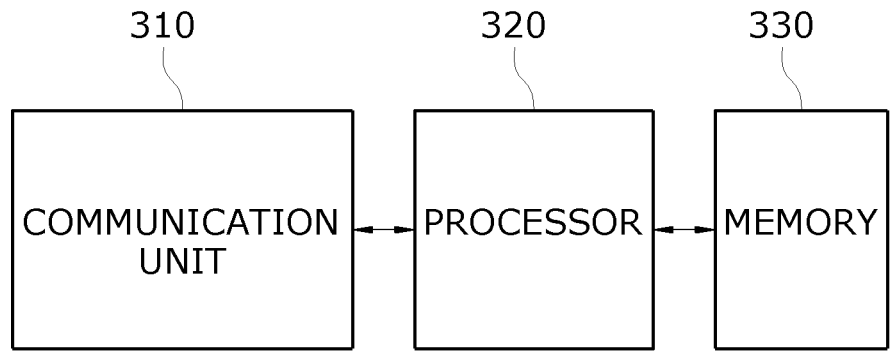
FIG. 5 is a block diagram schematically illustrating an internal configuration of a block distributing server illustrated in FIG. 1.

FIG. 5 is a block diagram schematically illustrating an internal configuration of the block distributing server 300 illustrated in FIG. 1.

Referring to FIG. 5, the block distributing server 300 may be a computing device having a communication function, and the block distributing server 300 may receive block chain data including a new block added to a block chain from the block providing server 200 and may distribute (propagate) the received block chain data to all nodes.

The block distributing server 300 may include a communication unit 310, a processor 320, and a memory 330. The communication unit 310 may construct a communication channel 250 along with the block providing server 200, and moreover, may construct a communication channel 350 along with the user device 300.

The communication channel may include a wired and/or wireless communication channel. The processor 320 may control an operation of the communication unit 310 to distribute (propagate) block chain data, received from the block providing server 200, to all nodes constituting a block chain.

The memory 330 may store the block chain data received from the block providing server 200 on the basis of control by the processor 320.

A general individual user may not be easy to perform a management operation of storing and distributing all blocks constituting a block chain and a data transaction included in each of the blocks. Accordingly, the block distributing server 300 may be a server which includes a hardware device for processing big data and autonomously performs management of the block chain data.

When the block distributing server 300 includes a hardware device for processing big data, another special condition for performing a function of the block distributing server 300 may not be needed.

Figure 6:
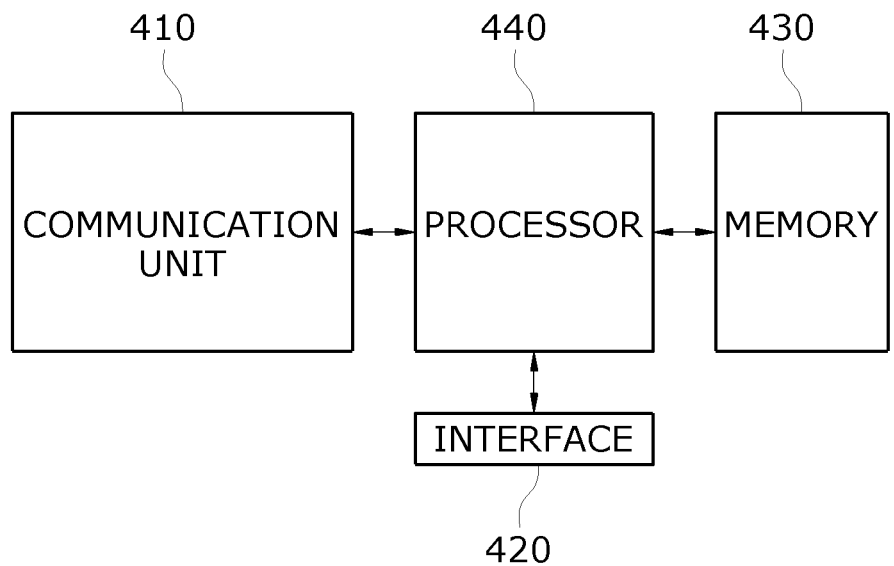
FIG. 6 is a block diagram schematically illustrating an internal configuration of a user device illustrated in FIG. 1.

FIG. 6 is a block diagram schematically illustrating an internal configuration of the user device 400 illustrated in FIG. 1.

Referring to FIG. 6, the user device 400 may search for data including a specific keyword in block chain data distributed (disclosed or shared) by the block distributing server 300 and may be a computing device including a communication function.

The user device 400 may include a communication unit 410, an interface 420, a memory 430, and a processor 440.

The communication unit 410 may construct a communication channel 350 along with the block distributing server 300, and the communication channel 350 may include a wired communication channel and a wireless communication channel.

In order to search for data included in the block chain data distributed through the block distributing server 300, the communication unit 410 may receive block information about a new block generated by the block providing server 200 and may transfer the received block information to the processor 440.

Here, the block information may be information including a block header included in the new block. In this case, a user may receive only the block header for search and may search for data desired by the user by using the received block header, and thus, may perform efficient search.

The interface 420 may be an input device which transfers a specific keyword, input based on a user input, to the processor 440 so as to search for data included in the block chain data distributed through the block distributing server 300.

The memory 120 may be a storage medium which stores various algorithms associated with data search and the memory 120 may include a non-volatile memory and a volatile memory.

Here, the algorithms may include an algorithm which implements THE Bloom filter generating function BF( ) used for the data generating device 100 to calculate a Bloom filter and a search algorithm for data search.

The processor 440 may control operations of the communication unit 410, the interface 420, and the memory 430 and may execute an algorithm stored in the memory 430 to perform a search process of searching for data including a specific keyword in the block chain data.

In the search process according to an embodiment of the present invention, the processor 440 may first receive, through the interface 420, a specific keyword K which is to be used for search by the user.

The processor 440 may call the Bloom filter generating function BF( ) from the memory 430 and may apply the called Bloom filter generating function BF( ) to the specific keyword to generate (or calculate) a Bloom filter ($F_K$=BF(K)) corresponding to the specific keyword.

The processor 440 may perform search based on the following search equation by using the Bloom filter ($F_K$=BF(K)) corresponding to the specific keyword.

$$F_K = BF_i \char`\^ F_K \qquad \text{[Search Equation]}$$

Here, ^ may denote a bitwise AND operation.

For example, in a case which performs search on a block between an $A^{th}$ block and a $B^{th}$ block, the processor 440 may receive all blocks $BF_i$ satisfying the search equation from the block distributing server 300 and performs the same search on a Bloom filter included in each of the received blocks, and when there is a match therebetween, the processor 440 may detect a corresponding data transaction as data which is to be searched for by the user.

Figure 7:
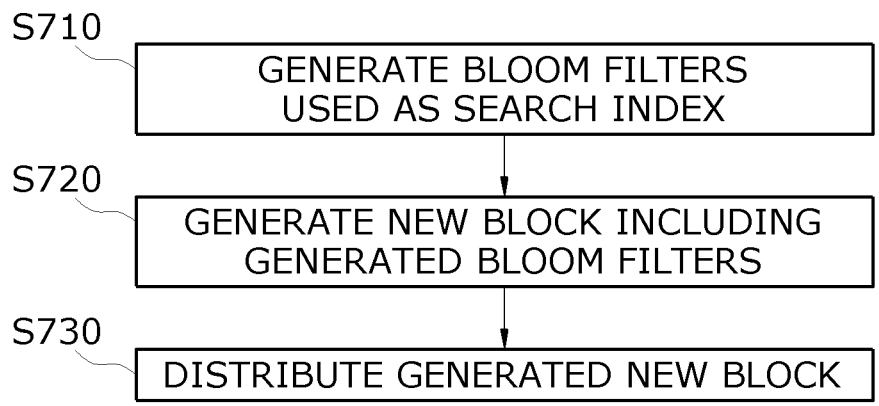
FIG. 7 is a flowchart for describing a method of providing a search index having a Bloom filter form in a distributed data sharing environment based on a block chain, according to an embodiment of the present invention.

FIG. 7 is a flowchart for describing a method of providing a search index having a Bloom filter form in a distributed data sharing environment based on a block chain, according to an embodiment of the present invention.

Referring to FIG. 7, the method of providing a search index according to an embodiment of the present invention may be largely divided into three steps S710, S720, and S730. An element for performing step S710 may be a data generating device (100 of FIG. 1 or the processor 130 of FIG. 2), and an element for performing step S710 may be a block providing server (200 of FIG. 1 or the processor 240 of FIG. 3). Also, an element for performing step S730 may be a block distributing server (300 of FIG. 1 or the processor 320 of FIG. 5).

The method of providing a search index according to an embodiment of the present invention may further include a step of searching for data by using the user device 400.

First, in step S710, a process of generating Bloom filters used as a search index may be performed by the data generating device 100.

Here, a hash value calculated by applying a hash function to a keyword set for searching for data which is to be shared by a data provider operating the data generating device 100 may be used for generating the Bloom filters. That is the Bloom filters may be calculated based on the hash value.

Subsequently, in step S720, a process of generating a new block including the Bloom filters generated based on performing step S710 may be performed by the block providing server 200.

Step S720 may be a process of generating the new block on the basis of the Bloom filters and the data received from the data generating device 100, for generating the new block, and performing PoW on the new block, for adding the new block to the block chain.

The PoW-completed new block may be configured with block chain data and may be transmitted to the block distributing server 300.

Subsequently, in step S730, a process of distributing the block chain data to all user nodes may be performed by the block distributing server 300. Through such a distributing process, the Bloom filters used as the search index included in the new block may be provided to the user.

Figure 8:
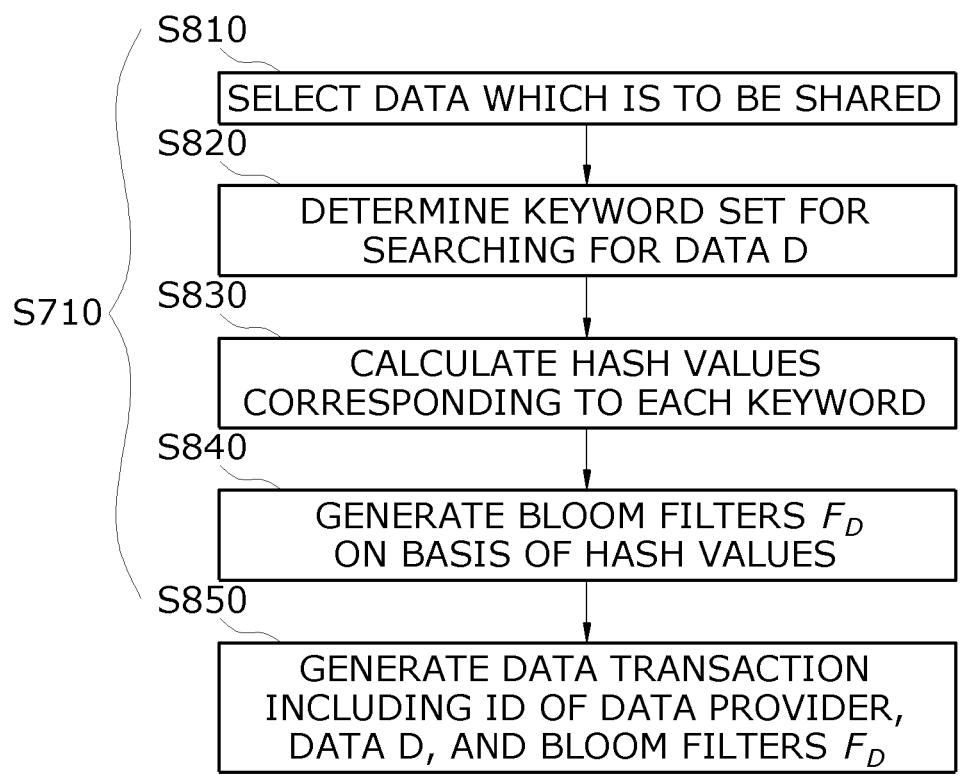
FIG. 8 is a detailed flowchart of step S710 illustrated in FIG. 7.

FIG. 8 is a detailed flowchart of step S710 illustrated in FIG. 7.

Referring to FIG. 8, in step S810, a process of selecting data D which is to be shared by the data provider may be performed.

Subsequently, in step S820, a process of determining the keyword set $\{K_1, K_2, \ldots, K_n\}$ including a plurality of keywords for searching for the selected data D may be performed.

Subsequently, in step S830, a process of, when the hash function includes a plurality of hash functions $h_1(\ )$, $h_2(\ ), \ldots,$ and $h_d(\ )$, applying the plurality of hash functions $h_1(\ ), h_2(\ ), \ldots,$ and $h_d(\ )$ to each of the keywords to calculate a plurality of hash values may be performed.

Subsequently, in step S840, a process of calculating (generating) Bloom filters $F_D$ corresponding to the search index on the basis of the calculated plurality of hash values may be performed.

Subsequently, in step S850, a process of generating a data transaction including an ID of the data provider (or the data generating device), the selected data D, and the Bloom filters $F_D$ may be performed. The generated data transaction may be transmitted to all nodes including the block providing server 200.

Figure 9:
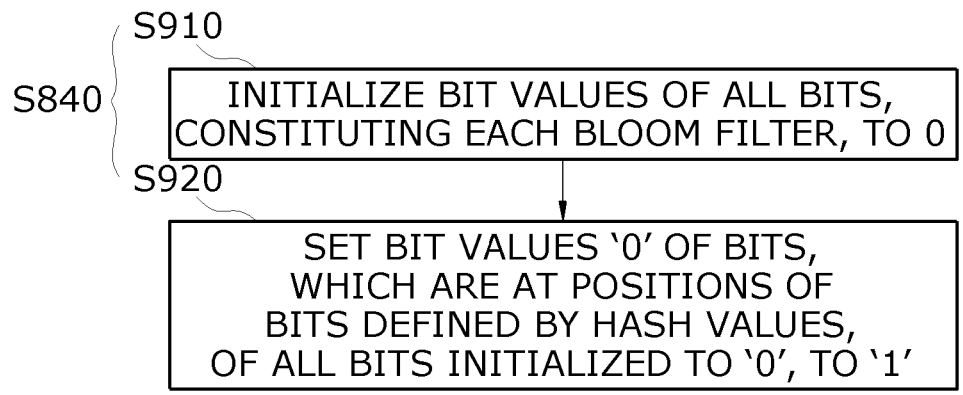
FIG. 9 is a detailed flowchart of step S840 illustrated in FIG. 8.

FIG. 9 is a detailed flowchart of step S840 illustrated in FIG. 8.

Referring to FIG. 9, in step S910, a process of initializing bit values of all bits, constituting each of the Bloom filters, to '0 (zero)' may be performed.

Subsequently, in step S920, a process of generating Bloom filters having a bit string, where bit values '0' of bits, which are at positions of bits defined by the hash values calculated in step S830, of all bits initialized to '0 (zero)' are set to '1', may be performed.

Figure 10:
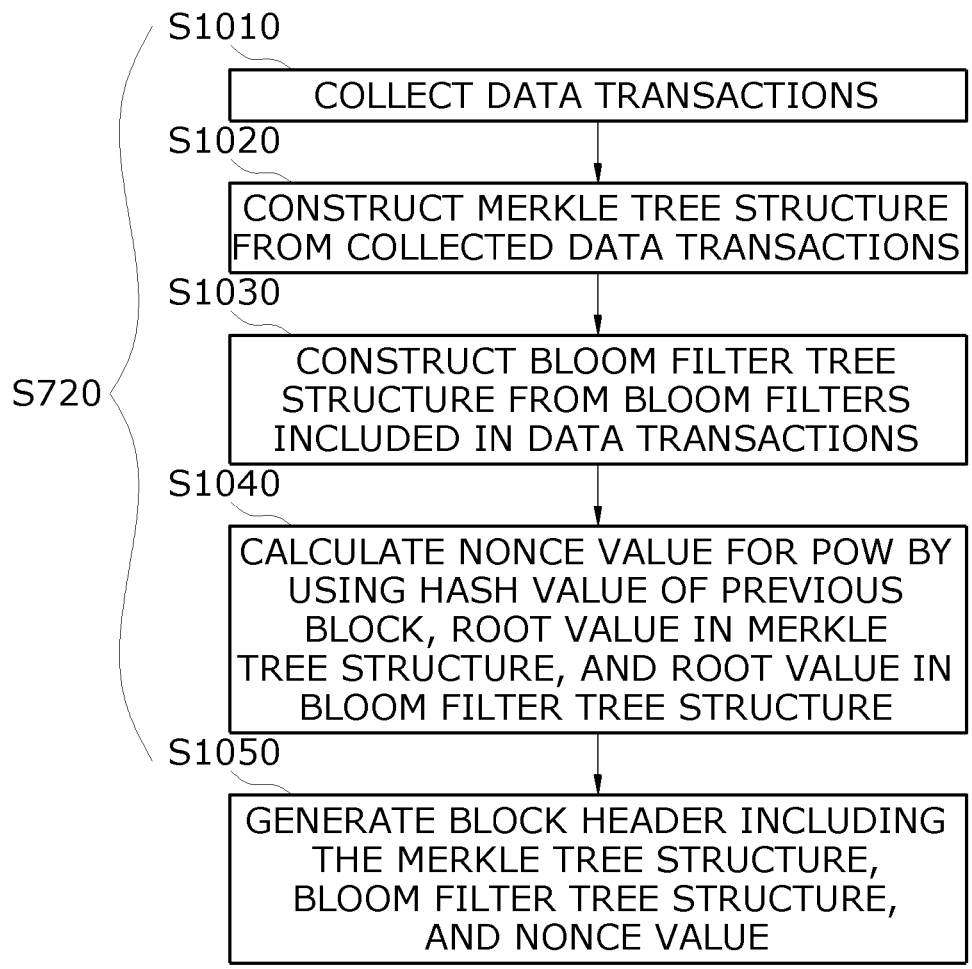
FIG. 10 is a detailed flowchart of step S720 illustrated in FIG. 7.

FIG. 10 is a detailed flowchart of step S720 illustrated in FIG. 7.

Referring to FIG. 10, first, in step S1010, a process of collecting a data transaction from the data generating device may be performed. In this case, the data transaction may include the ID of the data generating device, the data D, and the Bloom filters $F_D$.

Subsequently, in step S1020, a process of allocating a transaction, which is not included in a previous block, among the collected transactions to a root node, a leaf node, and a middle node between the root node and the leaf node to construct a Merkle tree structure may be performed.

Subsequently, in step S1030, a process of allocating the Bloom filters to the root node, the leaf node, and a middle node between the root node and the leaf node to construct a Bloom filter tree structure may be performed.

Subsequently, in step S1040, a process of calculating a nonce value for PoW by using a hash value of a previous block, a root value in the Merkle tree structure and a root value in the Bloom filter tree structure may be performed.

Here, the root value in the Merkle tree structure may be a value (a bit string) which, after values representing two child nodes having a root node as a parent node in the Merkle tree structure are connected, is calculated by applying a hash function to two connected values.

The root value in the Bloom filter tree structure may be a value (a bit string) which is calculated by performing a bitwise-OR operation on values representing two child nodes having a root node as a parent node in the Bloom filter tree structure.

The calculation of the nonce value may be a process of inputting a randomly-set temporary value to the cryptologic hash function (the nonce variable) until a block hash value calculated by applying the cryptologic hash function to the block header (a hash value of a previous block, the root value in the Merkle tree structure, and the root value in the Bloom filter tree structure) satisfies a condition defined in a distributed data sharing environment based on the block chain, and when a temporary value satisfying the condition is calculated, calculating the calculated temporary value as the nonce value.

Subsequently, in step S1050, a process of constructing (generating) a block header of the new block on the basis of the hash value of the previous block, the root value in the Merkle tree structure, the root value in the Bloom filter tree structure, and the nonce value may be performed.

As described above, according to an embodiment of the present invention, a Bloom filter (i.e., the root value BFR in the Bloom filter tree structure) used as a search index may be used as an input for calculating the nonce value.

Therefore, a consensus process based on PoW performed on the new block 60 may include a consensus process based on PoW performed on a search index constructed in a Bloom filter form, thereby ensuring the integrity (reliability) of the search index.

According to the embodiments of the present invention, a block including a reliability(integrity)-ensured search index may be generated by using a consensus algorithm of PoW in a distributed data sharing environment based on a block chain, and thus, in a distributed data sharing environment based on a block chain having no central reliability organization, a search index for efficient data search may be provided and the reliability (integrity) of the provided search index may be ensured.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing a search index based on a Bloom filter in a distributed data sharing environment based a block chain, the method comprising:

generating, by a data generating device, Bloom filters used as the search index on the basis of a hash value calculated by applying a hash function to a keyword set for searching for data which is to be shared;

generating, by a block providing server, a new block on the basis of the Bloom filters and the data received from the data generating device and performing proof of work (PoW) on the new block, for adding the new block to the block chain; and distributing, by a block distributing server, block chain data including the new block added to the block chain, wherein the performing of the PoW comprises:

continuously collecting, by the block providing server, transactions including an identifier (ID) of the data generating device, the data, and the Bloom filters from the data generating device;

allocating by the block providing server a transaction which is not included in a previous block, among the collected transactions to a root node, a leaf node, and a middle node between the root node and the leaf node to construct a Merkle tree structure:

allocating, by the block providing server, the Bloom filters to the root node, the leaf node and a middle node between the root node and the leaf node to construct a Bloom filter tree structure; and constructing, by the block providing server, a block header of the new block on the basis of a hash value of the previous block, a root value representing the root node in the Merkle tree structure a root value representing the root node in the Bloom filter tree structure and a nonce value calculated based on the PoW.

2. The method of claim 1, wherein the generating of the Bloom filters comprises:

selecting, by the data generating device, the data which is to be shared;

determining, by the data generating device, the keyword set including a plurality of keywords for searching for the selected data;

when the hash function includes a plurality of hash functions, applying the plurality of hash functions to each of the plurality of keywords to calculate a plurality of hash values; and generating Bloom filters corresponding to the search index on the basis of the calculated plurality of hash values.

3. The method of claim 1, wherein:

the root value representing the root node in the Merkle tree structure is a value which, after values representing two child nodes of a root node in the Merkle tree structure are connected, is calculated by applying a hash function to two connected values, and the root value representing the root node in the Bloom filter tree structure is a value which is calculated by performing a bitwise-OR operation on values representing two child nodes of the root node in the Bloom filter tree structure.

4. A search method based on a Bloom filter form in a distributed data sharing environment based a block chain, the search method comprising:

generating, by a data generating device, Bloom filters used as a search index by applying a hash function to a keyword set for searching for data which is to be shared;

constructing, by a block providing server, a block header on the basis of the Bloom filters generated by the data generating device and performing proof of work (PoW) on the basis of the block header to generate a new block including the block header; and receiving, by a block distributing server, block chain data including the new block from the block providing server and distributing the block chain data; and searching for, by a user device, data including a specific keyword in the block chain data, wherein the performing of the PoW comprises:

continuously collecting, by the block providing server, transactions including an identifier (ID) of the data generating device, the data, and the Bloom filters from the data generating device;

allocating, by the block providing server, a transaction, which is not included in a previous block, among the collected transactions to a root node, a leaf node, and a middle node between the root node and the leaf node to construct a Merkle tree structure;

allocating, by the block providing server, the Bloom filters to the root node, the leaf node, and a middle node between the root node and the leaf node to construct a Bloom filter tree structure; and constructing, by the block providing server, a block header of the new block on the basis of a hash value of the previous block, a root value representing the root node in the Merkle tree structure, a root value representing the root node in the Bloom filter tree structure, and a nonce value calculated based on the PoW.

5. The method of claim 4, wherein the searching comprises:

receiving, by the user device, only the block header from the block distributing server; and searching for the data by using the received block header.

6. A system for providing a search index having a Bloom filter form in a distributed data sharing environment based a block chain, the system comprising:

a data generating computer for generating Bloom filters used as a search index on the basis of a hash value calculated by applying a hash function to a keyword set for searching for data which is to be shared;

a block providing server for generating a new block on the basis of the Bloom filters and the data received from the data generating computer and performing proof of work (PoW) on the new block, for adding the new block to the block chain; and a block distributing server for distributing block chain data including the new block added to the block chain, wherein the block providing server comprises:

a transceiver for receiving data transaction including an identifier (ID) of the data generating computer, the data, and the Bloom filters from the data generating computer; and a processor for constructing a block header of the new block on the basis of a hash value of a previous block, a root value representing a root node in a Merkle tree structure constructed from the data transaction, a root value representing a root node in a Bloom filter tree structure constructed from the Bloom filter, and a nonce value calculated based on the PoW.

7. The system of claim 6, wherein the data generating computer comprises:

a memory for storing a plurality of hash functions; and a processor for generating the Bloom filters by using a plurality of hash values calculated by applying the plurality of hash functions to each keyword included in the keyword set.

8. The system of claim 6, further comprising a user computer for receiving a block header of the new block from the block distributing server and searching for data including a specific keyword in the block chain data including the block header.

9. The system of claim 8, wherein the block header comprises Bloom filters used as the search index.

10. The system of claim 8, wherein the user computer calculates a Bloom filter ($F_K$=BF(K)) corresponding to the specific keyword, calculates Bloom filters $BF_i$ satisfying $F_K$=$BF_i$ $\hat{}$ $F_K$ among Bloom filters included in the block header, and detects data, corresponding to the calculated Bloom filters $BF_i$, data including the specific keyword.

* * * * *